United States Patent
Veyseh et al.

(10) Patent No.: US 8,755,403 B2
(45) Date of Patent: Jun. 17, 2014

(54) BLOCK ACKNOWLEDGEMENT FOR WIRELESS COMMUNICATION METHODS, APPARATUSES AND SYSTEMS

(75) Inventors: Marzieh Veyseh, Mountain View, CA (US); Ryosuke Fujiwara, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 13/293,021

(22) Filed: Nov. 9, 2011

(65) Prior Publication Data
US 2013/0114622 A1 May 9, 2013

(51) Int. Cl.
*H04L 12/403* (2006.01)

(52) U.S. Cl.
USPC ........... 370/449; 370/229; 370/230; 370/252; 370/253; 370/346; 370/445

(58) Field of Classification Search
CPC .................... H04L 12/6418; H04L 1/1685
See application file for complete search history.

(56) References Cited

U.S. PATENT DOCUMENTS

| | | | |
|---|---|---|---|
| 7,385,976 B2 | 6/2008 | Gu et al. | |
| 7,688,176 B2* | 3/2010 | Jang et al. | 337/311 |
| 8,472,365 B2* | 6/2013 | Liu et al. | 370/312 |
| 2006/0018332 A1 | 1/2006 | Kakani et al. | |
| 2006/0056443 A1* | 3/2006 | Tao et al. | 370/462 |
| 2006/0104300 A1 | 5/2006 | Ho | |
| 2006/0107166 A1 | 5/2006 | Nanda | |
| 2006/0109833 A1 | 5/2006 | Uh et al. | |
| 2007/0258466 A1* | 11/2007 | Kakani | 370/395.53 |
| 2010/0002646 A1* | 1/2010 | Nishibayashi et al. | 370/329 |
| 2010/0183027 A1 | 7/2010 | Mueller | |
| 2010/0254369 A1 | 10/2010 | Tao et al. | |
| 2011/0090855 A1* | 4/2011 | Kim | 370/329 |
| 2012/0213097 A1* | 8/2012 | Bejerano et al. | 370/252 |
| 2013/0128808 A1* | 5/2013 | Wentink et al. | 370/328 |

* cited by examiner

*Primary Examiner* — Marsha D Banks Harold
*Assistant Examiner* — Anthony Sol
(74) *Attorney, Agent, or Firm* — Procopio, Cory, Hargreaves & Savitch LLP

(57) ABSTRACT

Systems and methods for reducing overhead by using block acknowledgment with an all polling technique while attempting to meet latency and QoS requirements. Each node transmits a number of packets upon receiving a polling message. The Access Point (AP) then replies with a Block Acknowledgement (BlockAck), which is combined with a subsequent polling message and contains a bitmap that indicates 1 for a successfully received packet and 0 for a failed reception.

20 Claims, 16 Drawing Sheets

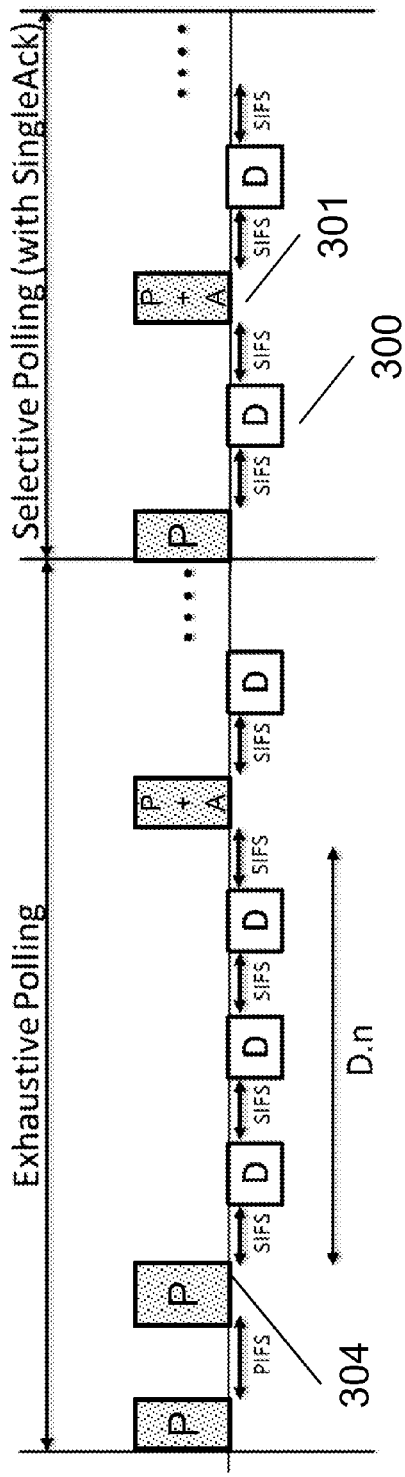
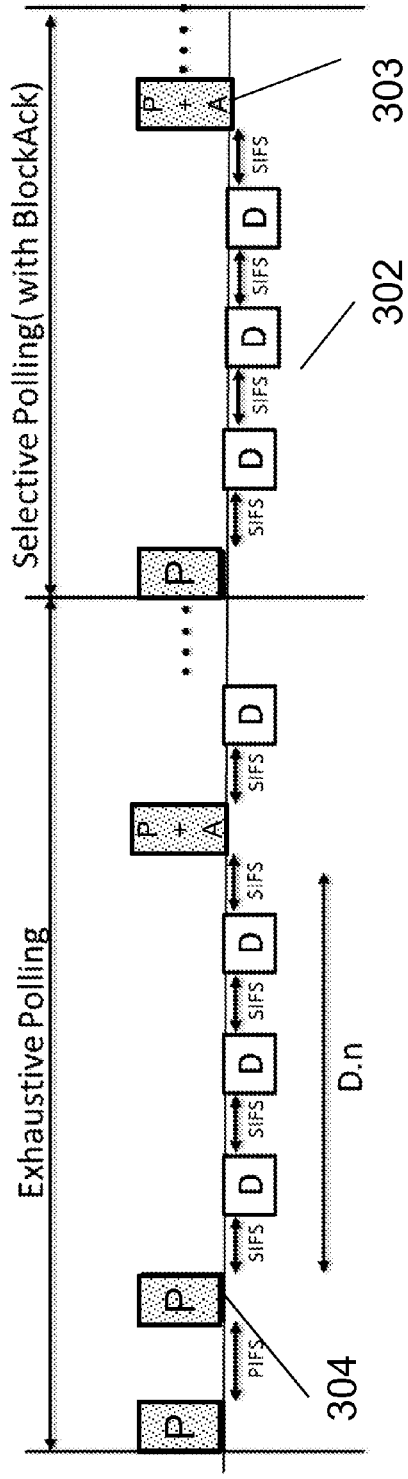
Figure 3(a)
Figure 3(b)

BLOCK ACKNOWLEDGEMENT FOR WIRELESS COMMUNICATION METHODS, APPARATUSES AND SYSTEMS

BACKGROUND

1. Technical Field

This invention is directed generally to wireless communication, and more specifically, for using a block acknowledgement to acknowledge data receipt in a polling based access method.

2. Background Art

A scheduled service interval (SI), which is the time interval used by the access point (AP) to periodically poll each non-AP STA (station), can be divided to three periods: an exhaustive polling phase, a selective polling phase and a CSMA phase.

In the exhaustive polling phase, the AP polls all of the STAs that require Quality of Service (QoS) transmissions by sending out a polling packet. Each STA transmits its data after it receives the polling packet.

In the selective polling phase, the AP checks if it failed to receive data from any STAs during the exhaustive polling phase, and then selectively polls the failed STAs. The AP continues to poll the failed STAs until the AP successfully receives data from all of the failed STAs.

The Carrier Sense Multiple Access (CSMA) phase is for communications of legacy devices based on the CSMA mechanism. Stations other than the QSTAs communicate in this period. Also, all STAs may communicate some configuration packets with the AP in this period.

CITATION LIST

Ma, J., Fujiwara, R., Systems, Methods, and Apparatuses for Wireless Methods, U.S. patent application Ser. No. 13/101,998, Filed May 5, 2011.

Uh, R., et al., Method for Processing Packets and Scheduling Superframe in Polling Based WLAN System, U.S. Patent Pub. No., 2006/0109833, Filed Nov. 5, 2005.

Tao, Z., et al., Cooperative Ultra-Reliable Wireless Communications, U.S. Patent Pub. No. 2010/0254369, Filed Apr. 7, 2009.

SUMMARY OF THE INVENTION

Technical Problem

A polling technique is needed so that the Access Point (AP) can manage Contention Free (CF) transmissions to reduce packet loss rate as well as latency. The polling technique should only be repeated for the unsuccessful transmissions to keep latency to a minimum. However, polling packets, as well as the needed acknowledgement packets, introduce extra overhead. Efficiency can be improved if the extra overhead can be reduced.

Solution to the Problem

Aspects of the exemplary embodiments may include an access point (AP), which includes a receiver that receives data packets during an exhaustive polling phase or a selective polling phase, in accordance to Block Acknowledgement (BlockAck) set up information; and a transmitter that transmits a BlockAck packet comprising the BlockAck set up information and a bit map indicating correctly received ones of the data packets during the exhaustive polling phase or the selective polling phase.

Aspects of the exemplary embodiments may further include a method, involving transmitting Block Acknowledgement (BlockAck) set up information; receiving data packets in response to the BlockAck setup information during an exhaustive or a selective polling phase; and generating a BlockAck packet comprising a bit map indicating correctly received ones of the received data packets.

Aspects of the exemplary embodiments may further include a station (STA), which includes a receiver that receives Block Acknowledgment (BlockAck) set up information comprising a buffer window for data packets; and a transmitter that transmits the data packets according to the buffer window during an exhaustive polling phase or a selective polling phase. The receiver receives a BlockAck packet comprising a bit map indicating correctly received ones of the data packets.

Aspects of the exemplary embodiments may further include a method of operating a station (STA), which includes receiving Block Acknowledgment (BlockAck) set up information comprising a buffer window for data packets; transmitting the data packets according to the buffer window; and receiving a BlockAck packet comprising a bit map indicating correctly received ones of the data packets.

BRIEF DESCRIPTION OF THE DRAWINGS

These, and or/other aspects will become more readily appreciated from the following description of the embodiments, taken in conjunction with the accompanying drawings, in which:

FIGS. 3(a) and 3(b) illustrate a system utilizing a block acknowledgment during the exhaustive polling phase and single acknowledgment during the selective polling phase and utilizing a block acknowledgement during the selective polling phase, respectively, in accordance with an exemplary embodiment.

DETAILED DESCRIPTION OF THE INVENTION

The exemplary embodiments described herein are directed to wireless industrial applications such as factory automation, building automation, process automations, and video surveillance and so forth. The requirements from such applications necessitate schemes that reduce latency and increase reliability while being able to coexist with legacy WiFi devices. The deterministic latency is important since the timing constraint of control systems in such networks is very low (e.g. 10-ms delivery latency or better). Similarly, the packet loss rate should be small to assure reliable data delivery in such networks (e.g. $10^{-6}$ packet loss rate or better).

The exemplary embodiments provide techniques to reduce polling/acknowledging overhead. Also, to further increase efficiency, an optimization algorithm is utilized by exemplary embodiments to distribute resources such that Quality of Service (QoS) is guaranteed and throughput is maximized.

In the IEEE 802.11n, a client joins the AP via Traffic Stream (TS) management signaling prior to establishing BlockAck in accordance with an exemplary embodiment. The client first transmits a BlockAck request to the AP, which contains the Sequence Number of the client's first packet (WinStartSN) as well as the Traffic Identifier (Traffic ID) of the MAC (Media Access Control) service data unit (MSDU). The AP then replies with a BlockAck response for confirming the WinStartSN and also for sending the buffer size of the receiving window for the transmitting node. The buffer size indicates how many consecutive packets can be transmitted for acknowledgement within one BlockAck. The number of consecutive packets is determined by the AP based on the throughput requirements, packet size, number of nodes, length of SI, channel conditions, and so forth. After the transmission of multiple packets from the client, the AP replies with a message containing the starting sequence number as well as a bit map in which each packet can be represented by a bit indicating correctly received and/or incorrectly received packets (e.g. set to 1 for a successful reception and set to 0 for a failed reception).

Figure 1:
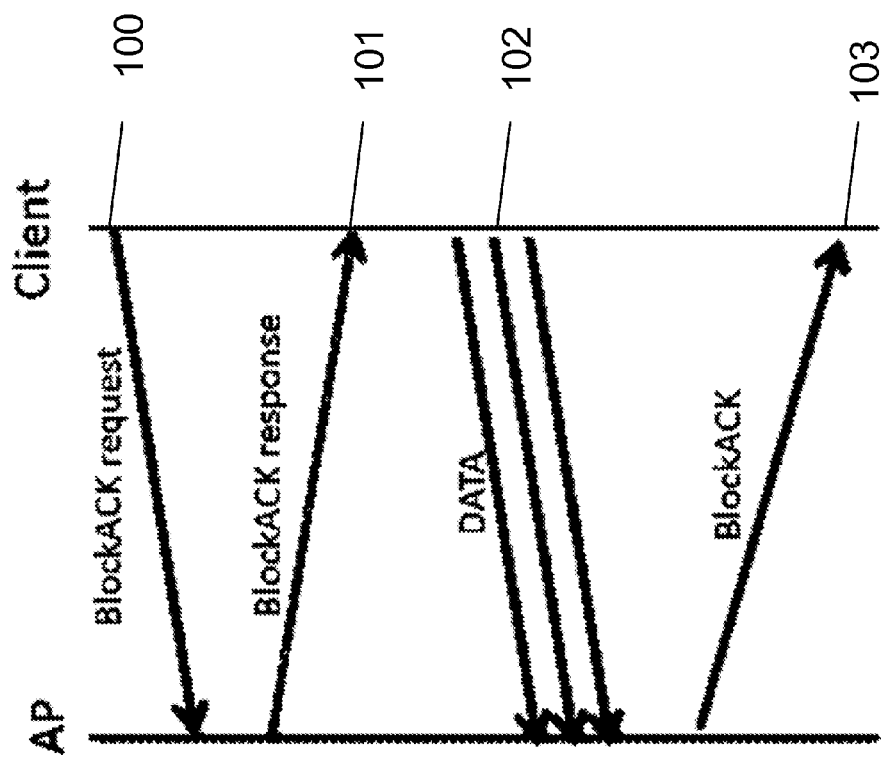
FIG. 1 illustrates an implementation of the BlockAck exchange procedure for the IEEE 802.11n standard in accordance with an exemplary embodiment.

FIG. 1 illustrates an implementation of the BlockAck exchange procedure for the IEEE 802.11n standard in accordance with an exemplary embodiment. As shown at 100, a request for a BlockAck may be sent from the client to the AP. At 101, the AP may then send a BlockAck response to the client. At 102, the client sends data packets to the AP in accordance to the parameters of the BlockAck response. At 103, the AP acknowledges the data packets by sending a BlockAck.

Figure 2:
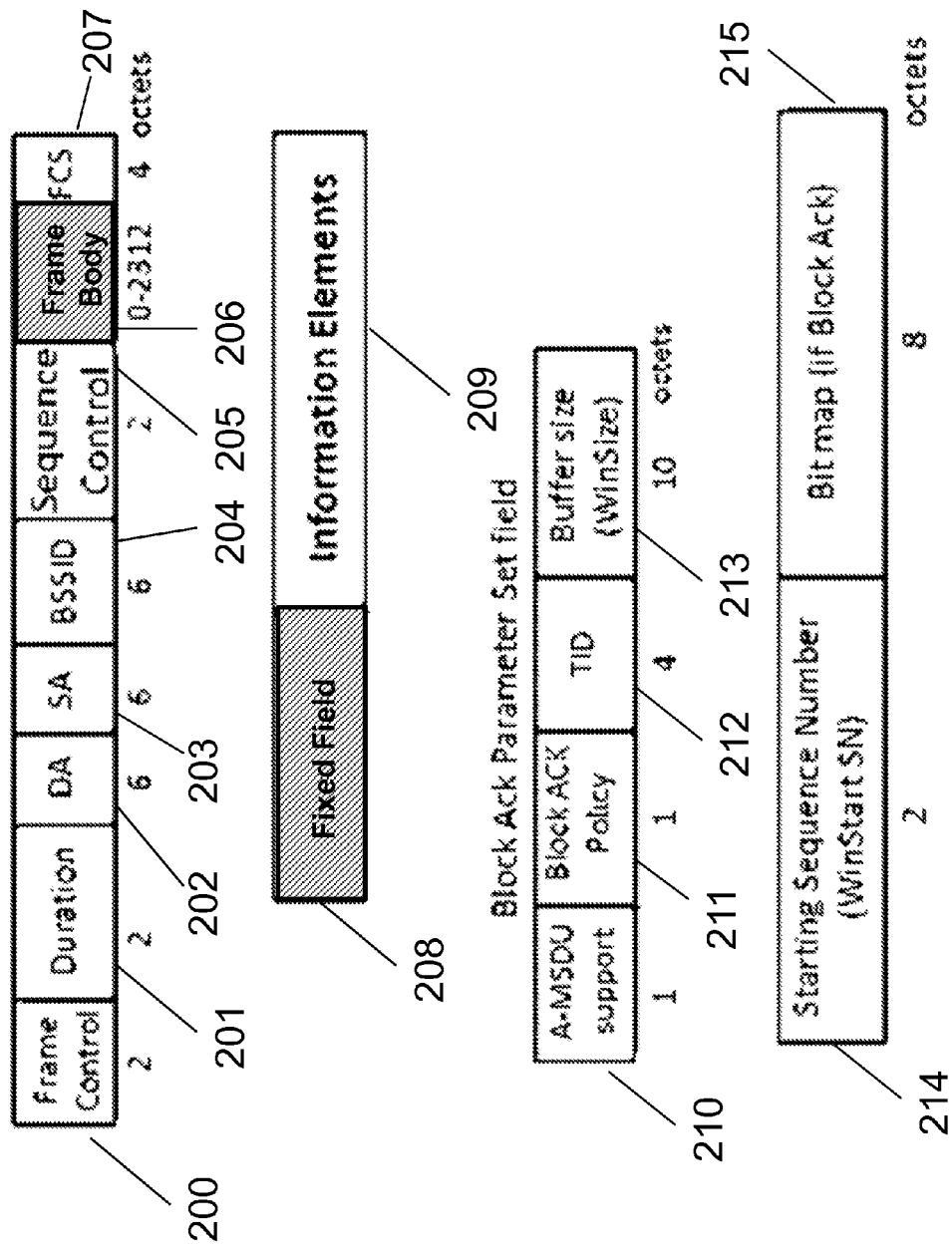
FIG. 2 illustrates a packet format of the BlockAck set up for the IEEE 802.11n standard in accordance with an exemplary embodiment.

FIG. 2 illustrates the packet format of the e BlockAck set up procedure for the IEEE 802.11n standard in accordance with an exemplary embodiment. The BlockAck set up packet may include standard fields from a MAC packet such as two octet entries for the frame control 200, the duration of the frame 201 and the sequence control 205, six octet entries for the destination address 202, the source address 203 and the base station identifier 204, up to 2312 octets for the frame body 206, and a four octet entry for the frame check sequence 207.

Within the IEEE 802.11n standard, the BlockAck can be broken into two types of information, namely, the fixed field information 208 and the information elements 209. The fixed field information 208 includes single octet entries for A-MSDU support 210 and the BlockAck policy 211, a four octet entry for the traffic identifier 212, and a ten octet entry for the buffer window size 213. The information elements 209 include two octet entries for the starting sequence number of the packet received 214, and an eight octet entry for the bitmap indicating correctly received packets 215.

The exemplary embodiments attempt to reduce overhead by using a BlockAck with an all polling technique, which should provide better efficiency while meeting the latency and QoS requirements. In the exemplary embodiments, the AP uses a similar method to the All-polling Media Access Control (MAC) to poll all non-AP STA during the exhaustive polling phase. In the selective polling phase, the AP polls the STAs from which the AP failed to receive data during the exhaustive polling phase. In the exemplary embodiments, each node transmits up to n packets upon the reception of the polling message. The AP then replies with a BlockAck, which is combined in the next polling message and contains a bitmap that can indicates correctly received and/or incorrectly received packets (e.g. 1 for a successfully received packet and 0 for a failed reception). The exemplary embodiments also include an optimization algorithm that selects the packet size and the number of packets per BlockAck for each node based on throughput optimization. The optimization may result in an increased throughput and an increased number of nodes that can transmit data packets to the AP. Since clients join the AP prior to the exhaustive polling phase through some signaling the AP knows the maximum physical layer data rate for each node based on this signaling. Thus, the AP utilizes this information to run an optimization algorithm and to assign a packet size and a buffer size (number of packets per BlockAck, n) to each node. The AP may include such information within the polling message. The non-AP STA node transmits up to n packets upon receiving the polling message.

The exemplary embodiments can also be used in case of packet aggregation when multiple physical layer packets are combined into an aggregated packet. The BlockAck as described can be used to acknowledge the reception of multiple physical layer packets using the explained bit map.

The AP includes the BlockAck within the next polling message to confirm the reception of the packets. The BlockAck contains a bitmap to indicate the status of the packets (e.g. indicating 1 for a successfully received packet and 0 for a failed reception). The AP polls the non-AP STA again in the next selective polling phase if any of the non-AP STAs packets were not successfully received, until all of the packets are received successfully.

Thus the polling message sent by the AP can include:

$$(\text{Polling Message} + \text{BlockACK}_{setup})_i + (\text{BlockACK})_j$$

The packet can include a polling message to node i, as well as the required information to set up a BlockAck for node i, as well as a Block acknowledgment directed to node j. When the (Polling Message+BlockACK$_{setup}$) is directed to node i, the BlockAck can also be simultaneously directed to node j, when j can be i−1, i−2, etc., as the address of a node that was polled before node i, if the polling messages between node j and node i were unsuccessful. Reliability can thereby be improved since the polling message is combined with a BlockAck, and by resending the BlockAck, the exemplary embodiments ensure that node j is receiving its acknowledgment if none of the polling+BlockAck messages were received by node j.

Figure 4:
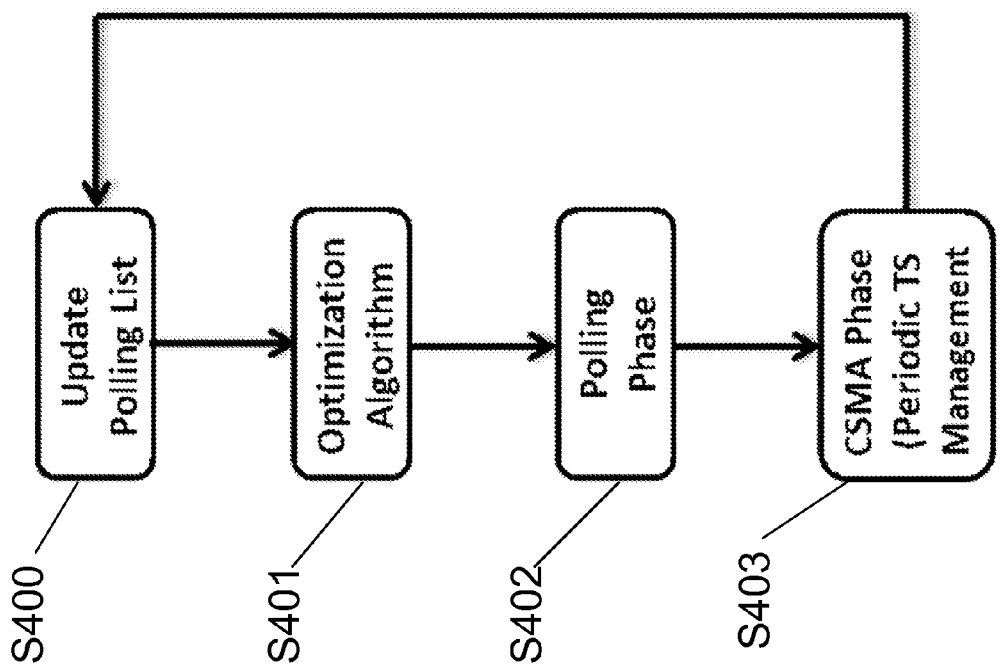
FIG. 4 illustrates an exemplary flow chart of the AP's operation in accordance with an exemplary embodiment.

FIGS. 3(a) and 3(b) illustrate a system utilizing a block acknowledgment during the exhaustive polling phase and single acknowledgment during the selective polling phase and utilizing a block acknowledgement during the selective polling phase, respectively, in accordance with an exemplary embodiment. In both cases, the AP sends a polling packet 304 directed to an individual node for receiving a data packets during the exhaustive polling phase. However, in FIG., 3(a), during the selective polling phase, the polled node sends a single packet 300, whereupon the AP will acknowledge receipt of the single packet 301. In FIG. 3(b) during the selective polling phase, the polled node sends multiple packets 302, whereupon the AP will acknowledge receipt of multiple packets 303 using a Block Acknowledgment. As seen in FIG. 3, more than one packet can be received by the AP for each polling packet sent. FIG. 4 illustrates an exemplary flow chart of the AP's operation in accordance with an exemplary embodiment. During the CSMA phase at S403, the TS management frames are periodically exchanged and the polling list is updated at S400 based on requests for transmitting data from the nodes. Also the AP collects channel information from all nodes for use in the optimization algorithm. Based on the collected information, the AP runs an optimization algorithm at S401 and during the polling phase at S402, polls the nodes according to the updated polling list.

Figure 5:
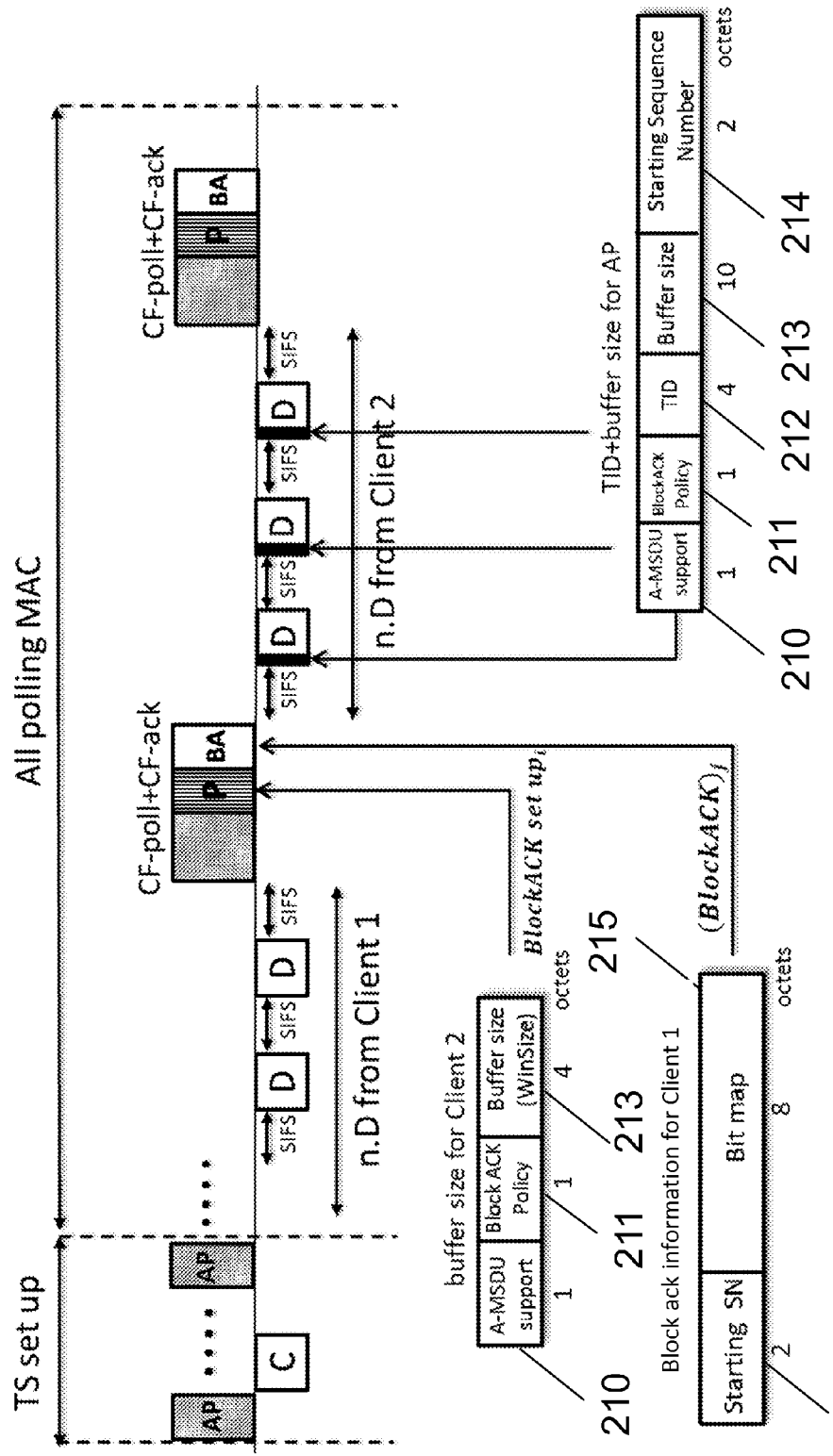
FIG. 5 illustrates an exemplary implementation of the BlockAck combined with the Contention Free polling (CF-Poll) and Contention Free Acknowledgement (CF-Ack) message in accordance with an exemplary embodiment.
Figure 13:
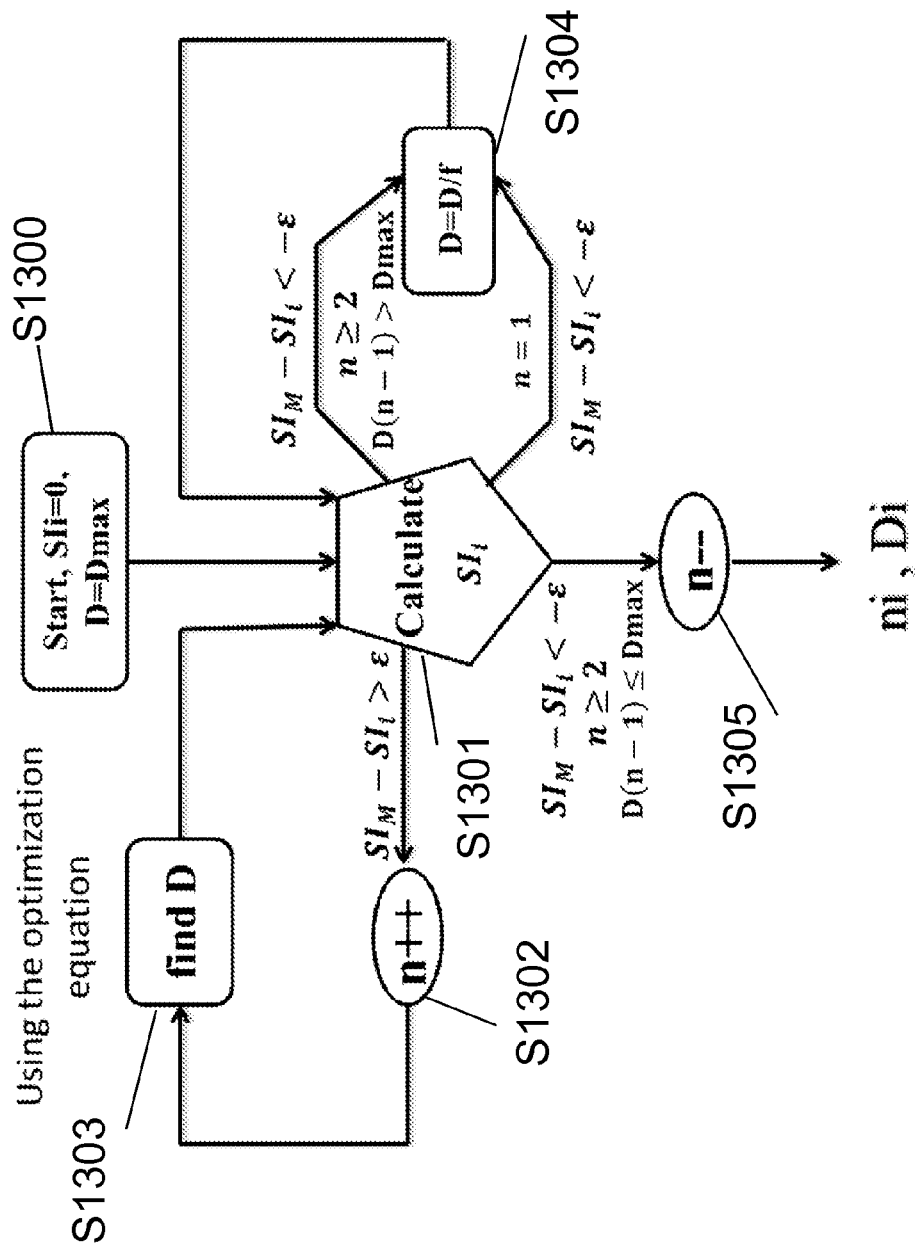
FIG. 13 illustrates a flow chart of the optimization algorithm in accordance with an exemplary embodiment.

FIG. 5 illustrates an exemplary implementation of the BlockAck combined with the CF-poll and CF-Ack message in accordance with an exemplary embodiment. Reference will be made to the elements of the BlockAck as depicted in FIG. 2. The CF-poll+CF-ack message contains the traffic ID (TID) 214 of the MSDU 210 as well as the buffer size (n) 213 or the window size for the incoming transmissions from client 1. Then the client starts transmitting data packets based on the WinSize selection by the AP. The WinSize may include information to indicate the number of packets that can be received during the polling as well as the packet size. The AP may select the WinSize based on an evaluation of the number of data packets that can be transmitted within a polling phase (either the exhaustive or the selective polling phase), evaluation of a size of the packets to optimize throughput, and evaluation of the WinStartSN. An example of how the AP may determine the WinSize is shown in FIG. 13.

The transmitted data packet should include the WinStartSN (SSN) 214 within the header of the data packets, so that the AP can know the sequence number for the head of the receiving buffer. After the data transmission ends, the AP sends a new CF-poll+CF-ack to client 2 with the TID and the WinSize while this message contains the BlockAck for client 1.

Figure 6:
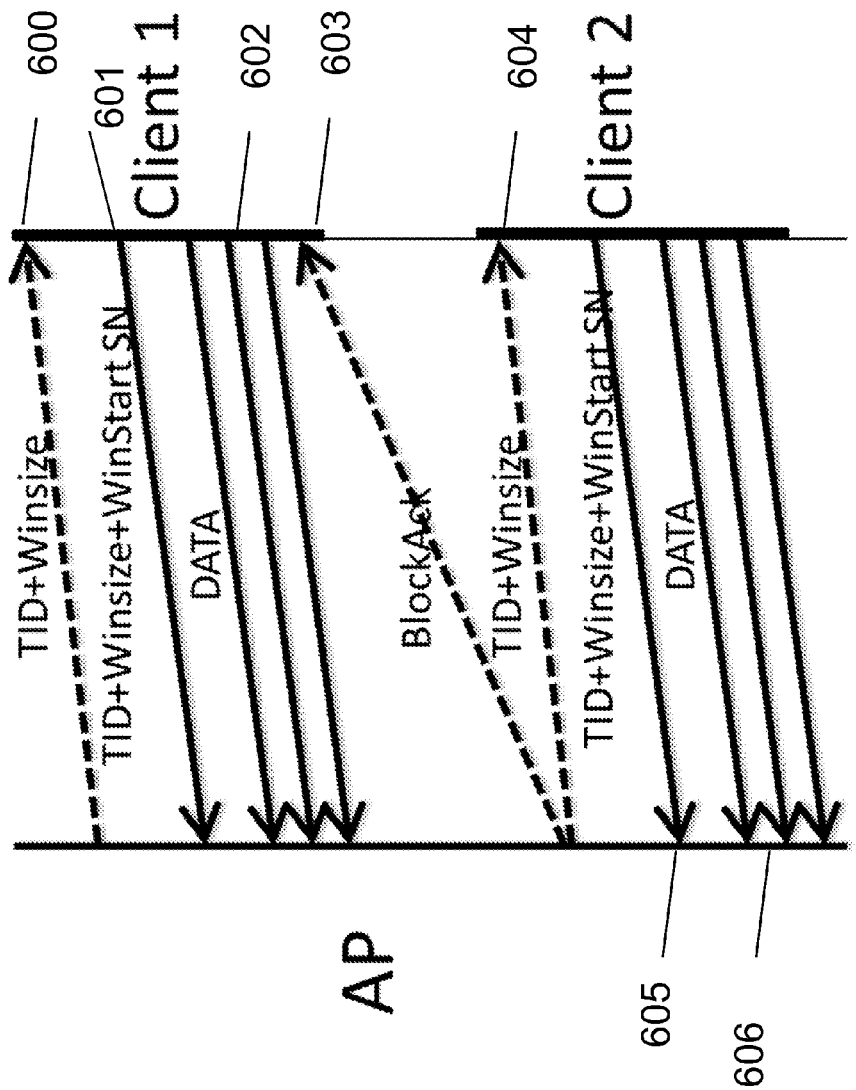
FIG. 6 illustrates the content and order of messages exchanged after combining polling with BlockAck in accordance with an exemplary embodiment.

FIG. 6 shows the content and order of messages exchanged after combining polling with BlockAck in accordance with an exemplary embodiment. At 600, the AP sends the TID and the buffer size to the node for packet receipt. At 601, the node acknowledges the TID and the buffer size, and sends the starting sequence number of the packets as part of the header of the data packets sent to the AP. At 602, the node sends the data packets to the AP based on the WinSize selection by AP. At 603, the AP sends a BlockAck to acknowledge the received data packets. The BlockAck is included in the polling packet to the next client as shown in 604. The next client submits data packets in response to the polling message, as shown in 605.

Figure 7:
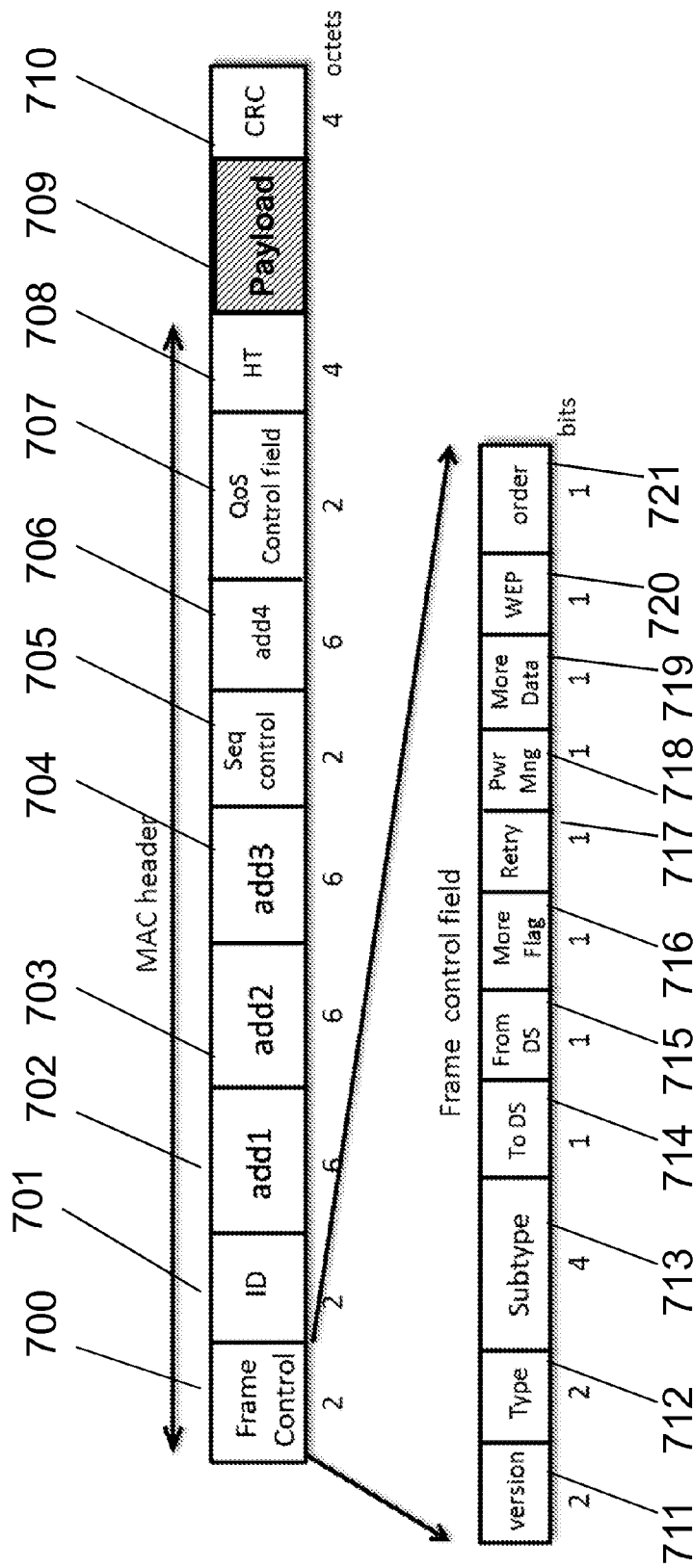
FIG. 7 illustrates an exemplary header format of the QoS Data+CF-poll+CF-ack message that includes a Polling+BlockAck message in accordance with an exemplary embodiment.

FIG. 7 illustrates an exemplary header format of the QoS Data+CF-poll+CF-ack message that includes a Polling+BlockAck message in accordance with an exemplary embodiment. The polling packet includes 2 octet entries for frame control 700, the identifier 701, the sequence control of the packets 705, and the QoS control field 707. The identifier 701 may be used to indicate the duration in terms of n packets.

The polling packet also includes 6 octet entries for addresses, as shown in 702, 703, 704, and 706. For example, Address 1 702 may be used for the receiver's address and Address 2 704 may be used for the transmitter's address. Address 3 704 may be used for the destination address to indicate the final destination of the frame, and Address 4 may be used for the source address, which is the MAC address of the source that created the frame.

The polling packet also includes the standard 4 octet entries for a header type 708 and the bit error check 710.

Figure 8:
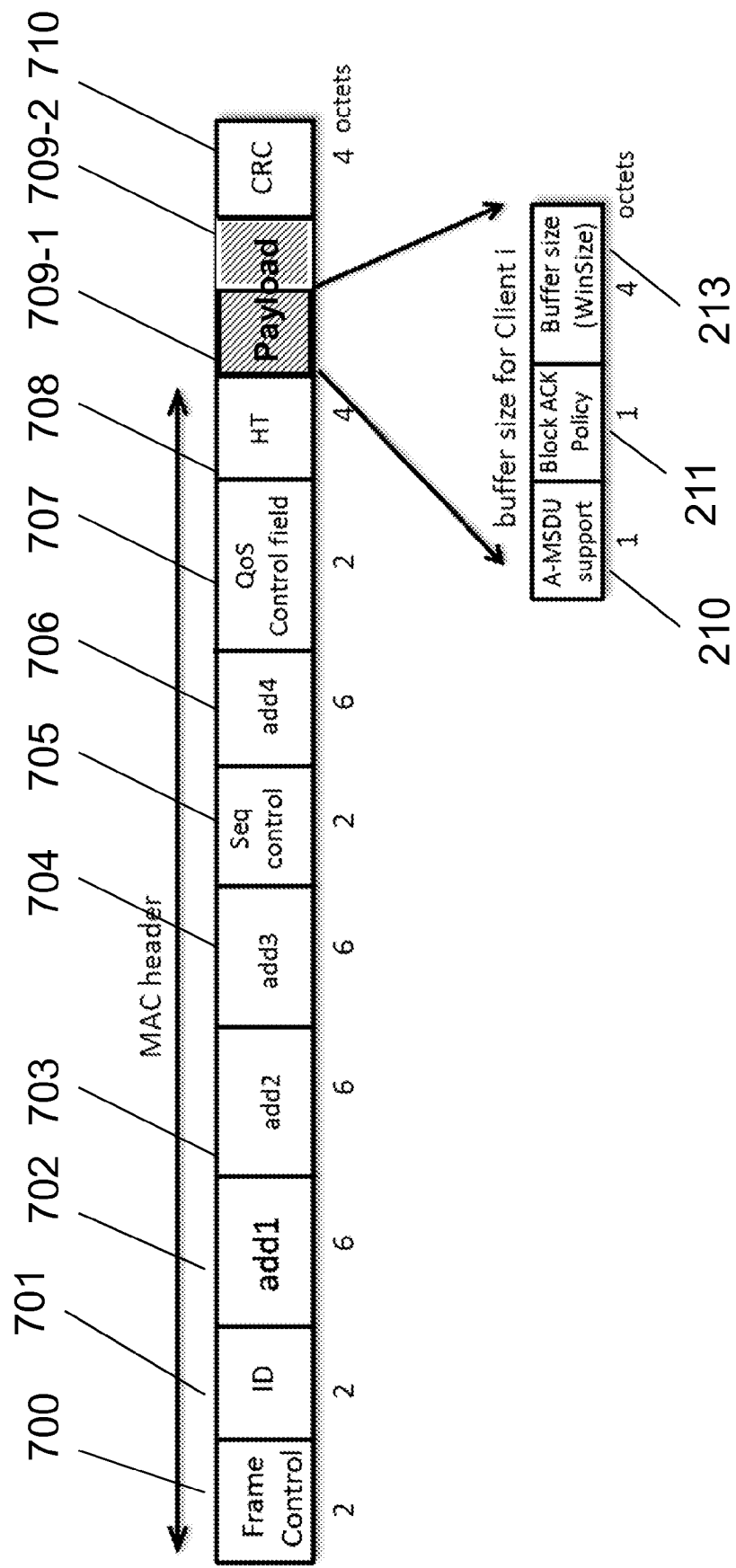
FIG. 8 illustrates exemplary set up information for a BlockAck that is included within the payload of the polling message, in accordance with an exemplary embodiment.

The frame control 700 may include two bit entries for the version 711 and the type 712, a four bit entry for the subtype 713, and one bit entries to indicate if the frame is going to the distribution system 714 or from the distribution system 715. The one bit entry for the more flag 716 indicates if there are more flags of the frame to be transmitted. The one bit entry for the retry 717 indicates that the frame had been previously sent. The one bit entry for the power management 718 indicates if the STA is in an active or power-saving mode. The one bit entry for the More Data 719 is used to indicate to a power saving STA if more frames are on the way. The one bit entry for the wireless encryption protocol (WEP) indicates if WEP is being used. The one bit entry for the order 720 indicates if the frame is to be processed in order or not. In an exemplary embodiment, the type is set to 1 for data and the subtype is set to 1011 for QoS Data+CF-Poll+CF-Ack. FIG. 8 illustrates exemplary set up information for a BlockAck that is included within the payload of the polling message, in accordance with an exemplary embodiment. The payload is separated to include the setup for the BlockAck 709-1 and the BlockAck itself 709-2. The BlockACK set up 709-1 for client i includes a one octet entry for MSDU support 210 which when set to 1, permits the use of A-MSDU for i's transmission. The BlockAck setup 709-1 also includes a one octet entry for the BlockAck Policy 211, which is a subfield that can be set to 1 for an immediate BlockAck and 0 for a delayed BlockAck. The BlockAck setup 709-1 may also include a four octet entry for the Buffer Size(WinSize) 212 to indicate the number of buffers for the TID.

Figure 9:
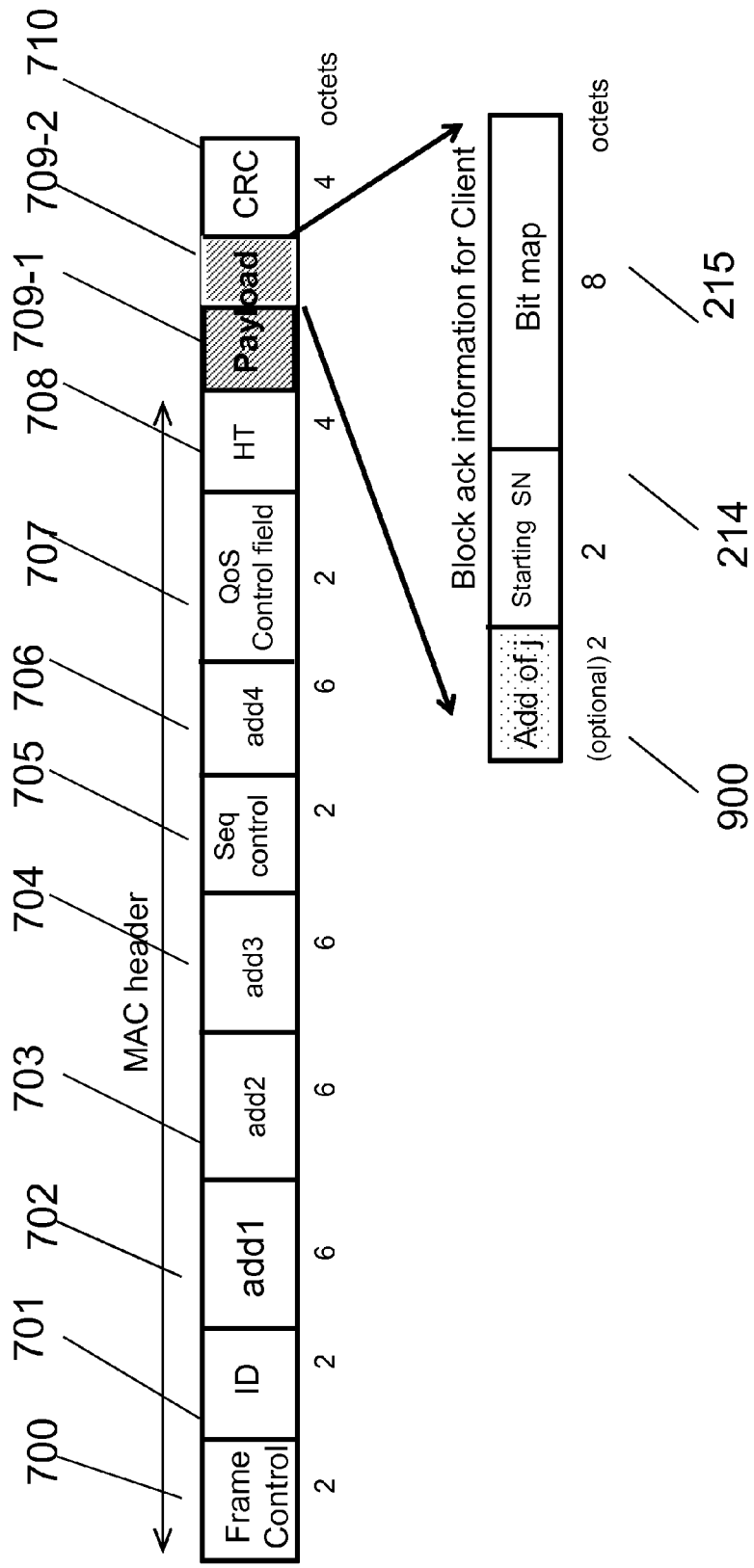
FIG. 9 illustrates an exemplary BlockAck included within the payload of the polling message in accordance with an exemplary embodiment.

FIG. 9 illustrates an exemplary BlockAck included within the payload of the polling message in accordance with an exemplary embodiment. The BlockAck 709-2 for client j includes a two octet entry for the Starting Sequence Number (WinStart SN) 215, which is the starting sequence number or the sequence number of the packet in the head of the buffer at the AP. The BlockAck 709-2 may further include an eight octet entry for a bit map 214, which is used to indicate the received status of up to 64 MSDUs and A-MSDUs. Each bit that is set to 1 acknowledges the successful reception of a single MSDU or AMSDU in the order of sequence number. Optionally, the BlockAck 709-2 may also include a two octet entry for the address of client j 900 to have directed acknowledgment to up to M previous transmissions to assure reliability in case of collisions.

Figure 10:
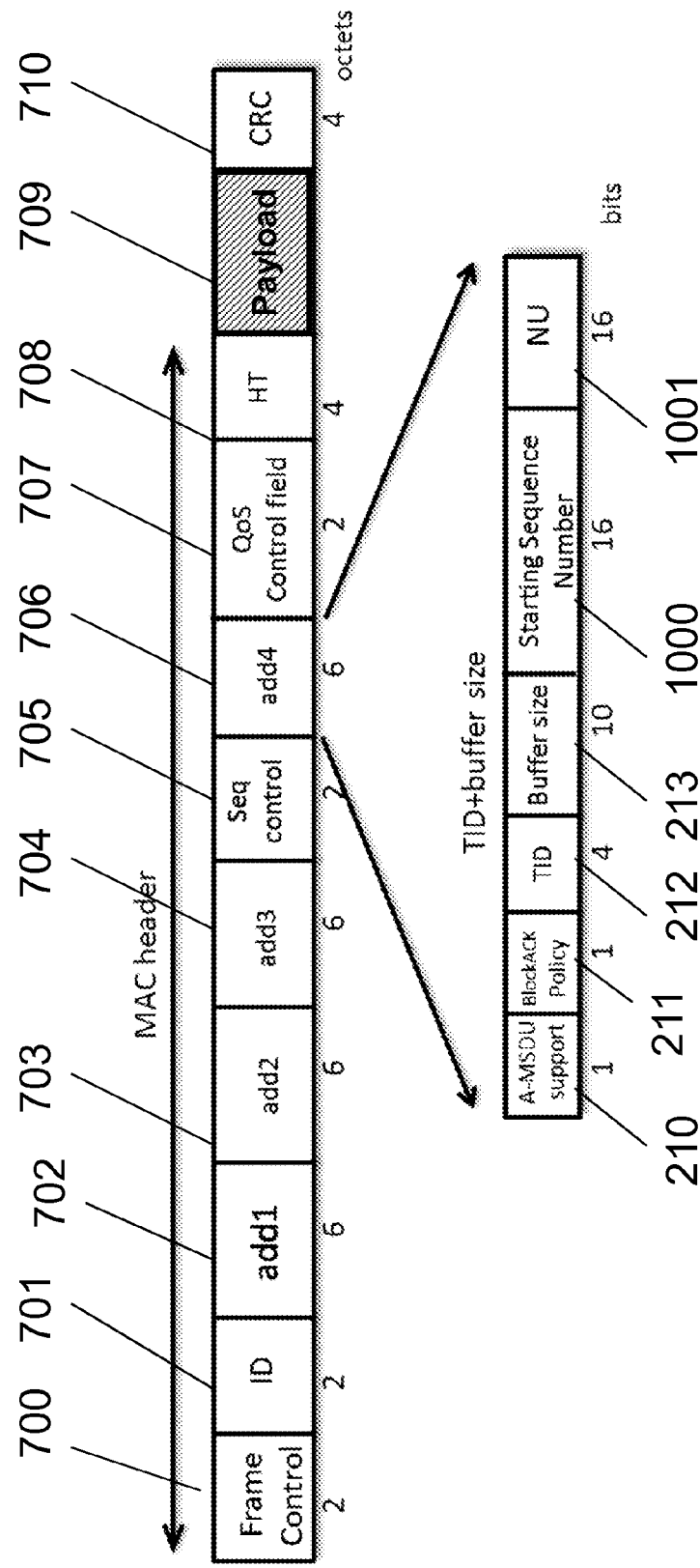
FIG. 10 illustrates utilizing the address4 field to carry the information related to BlockAck set up response in accordance to an exemplary embodiment.

FIG. 10 illustrates utilizing the address4 field 706 of the data packets to carry the information related to the BlockAck set up response, including the starting sequence number and the TID in accordance to an exemplary embodiment. All messages that are sent by client i include an information field at the address4 field (only used in 802.11n when the data frame is being distributed from one AP to another AP via the WM). The information is used at the AP to adjust its buffer based on the client's WinStart Sequence Number 1001 and the Buffer Size(WinSize) 213. As referenced from FIG. 2, the address4 field 706 includes single octet entries for A-MSDU support 210 and the BlockAck policy 211, a four octet entry for the traffic identifier 212, and a ten octet entry for the buffer window size 213. The address4 may also include a 16 octet entry for the starting sequence number of the packet received 1000.

Figure 11:
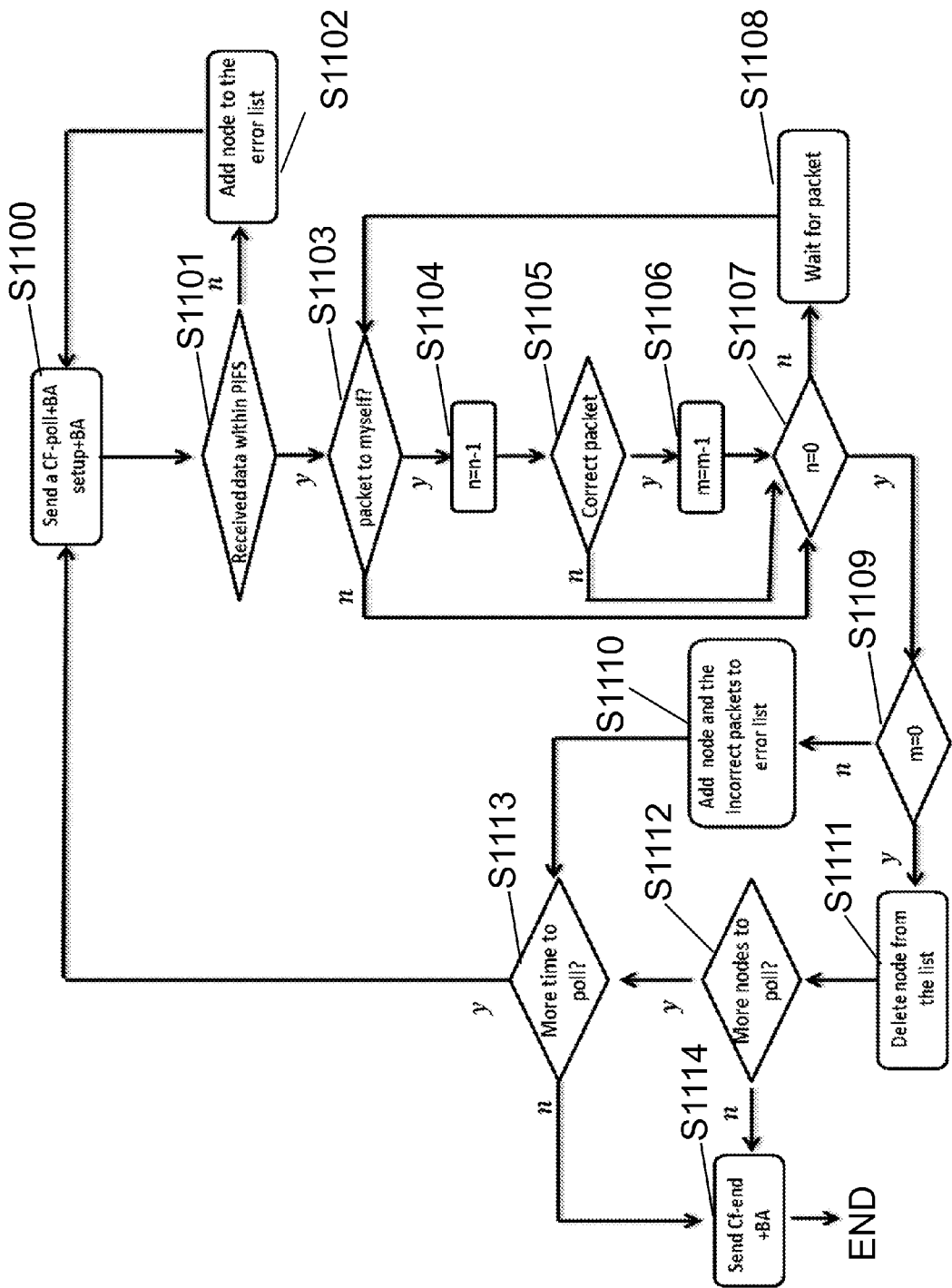
FIG. 11 illustrates a flowchart of the polling phase in accordance with an exemplary embodiment.

FIG. 11 illustrates a flowchart of the polling phase in accordance with an exemplary embodiment. The polling phase begins when the AP sends a CF-poll+CF BlockAck set-up to the first node in the schedule at S1100. Meanwhile the AP sets two parameters, n as the number of packets per BlockAck for his node, and m (m=n) as the number of successfully received packets from this node within this polling trial. If the AP receives a packet within the Point Coordinated Function Interframe Space (PIFS) time at S1101, and the packet is forwarded to the AP as shown in S1103, a counter n is reduced by 1 as shown in S1104. If no packet is received within the PIFS, then the node is added to the error list as shown in S1102.

If the packet is successfully received as shown in S1105, then m is reduced by 1 as shown in S1106. The AP checks if n is equal to 0 at S1107 to see if the transmission is complete. If not, then the AP will wait for the next packet at S1108.

If the transmission is complete, then the AP checks if m=0 at S1109, to ensure that all of the packets were received correctly. If the packets were not received correctly, then the node and the incorrectly received packets are added to the list for the bitmap in the BlockAck, as shown in S1110. The AP adds the node and the incorrect packets to the error list (the list of the nodes that should be polled again), and then checks if it has more time to poll the next node at S1112. When sending the new poll, the AP includes the BlockAck with the bitmap which has 1 for successful packets and 0 for the incorrect ones. When the AP checks n, if it is not equal to 0, it means that more packets should arrive so it waits for the packets and then goes back to checking if the packet is directed to the AP.

If the packets were received correctly, then the AP deletes the node from the schedule as shown in S1111 and checks if more nodes need to be polled at S1112. If no more nodes need to be polled, then the AP sends a CF-End packet to indicate the end of the polling phase as shown in S1114.

If more nodes need to be polled, then the AP checks if there is enough time to poll more nodes at S1113. If so, then the AP can send a new poll to the next node in the schedule and go to S1100. If there is not enough time or there are no more packets to be polled in the schedule, the AP sends a CF-end message that includes the last BlockAck.

Figure 12:
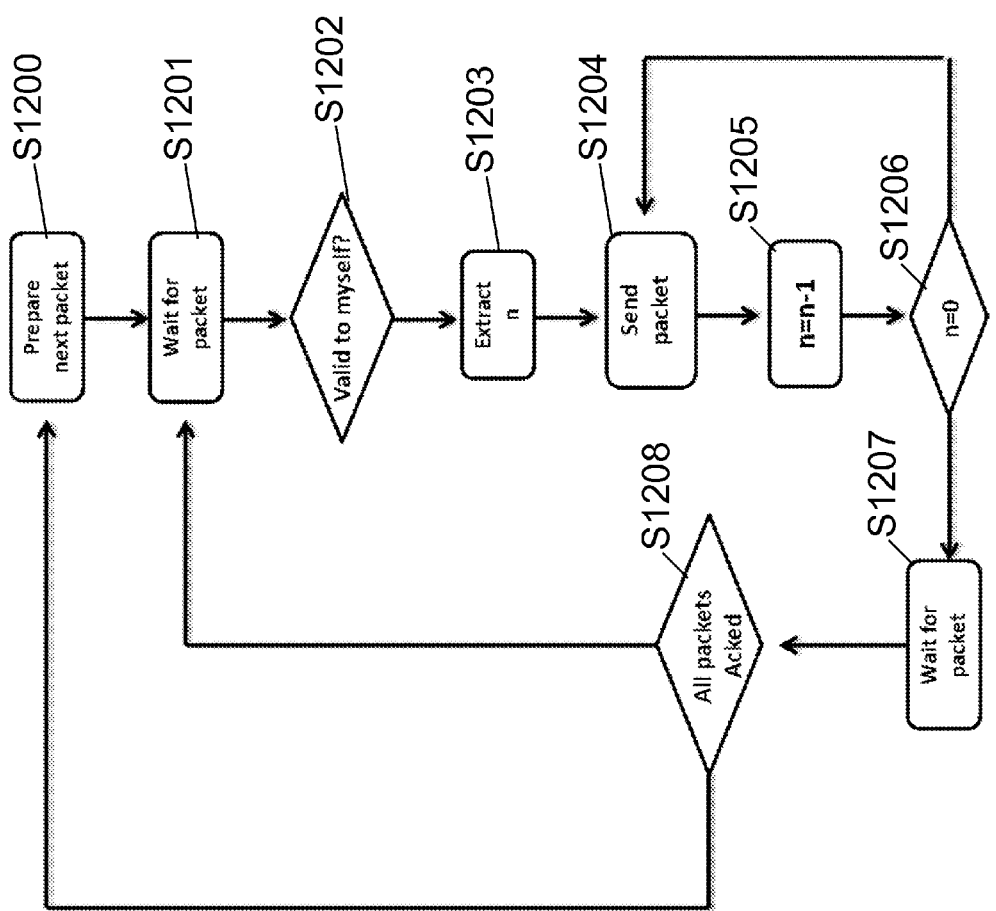
FIG. 12 illustrates a flow chart of the non-AP STA behavior in accordance with an exemplary embodiment.

FIG. 12 illustrates a flow chart of the non-AP STA behavior in accordance with an exemplary embodiment. After preparing the packet at S1200, the STA waits for the polling message at S1201. At S1202, the STA waits for receipt of a valid poll directed at the STA. Once received, the STA extracts n (buffer size) from the polling message at S1203, sends a packet at S1204, and reduces n by 1. At S1206, the STA checks if n is equal to 0. If so, the STA goes to S1207 to wait for the next polling message that carries the BlockAck for the STA. If all packets are acknowledged at S1208, then the STA prepares the next packet at S1200, If the packets are not acknowledged successfully, the node waits for the next polling message to resend the packets by going back to S1201. When checking n, if n is not equal to 0, the STA prepares another packet and sends this packet.

The AP selects the optimum parameters for each node by considering the various parameters as shown in Table 1 below. When the BER (Bit Error Rate) is the same for all of the nodes, the probability of not receiving a packet after sending a poll at the AP varies from node to node. The physical layer data rate is also different for each node selected based on each node's SNR.

Therefore, the average length of the exhaustive polling phase can be calculated as:

$$\overline{T_E} = N.P + \sum \left( (1 - P_{Vi}) \left( SIFS + \left( SIFS + \frac{D_i}{M_i} \right) n_i \right) + P_{Vi} PIFS \right)$$

TABLE 1

| Parameter description for the optimization calculations: | |
|---|---|
| Di | Packet Length for node i |
| P | Polling packet length |
| SIFS | SIFS length |
| PIFS | PIFS length |
| Mi | Data Rate for node i |
| Pvi | Probability of client i not responding to the polling message |
| ni | Number of packets per block Ack for node i |
| N | Number of Clients |
| pe | Physical layer probability of error |
| BER | Bit error rate |

The exemplary embodiments attempt to optimize throughput by calculating the minimum length of SI that results in close to zero packet loss rate. Since the number of transmissions for an eventual successful transmission is geometrically distributed with the parameter $P_{eri} = P_{vi} + (1 - P_{vi}) P_e$, the total time for N nodes is:

$$\text{Min} SI = \sum (P + P_{ti}) + \frac{\sum (P + P_{ti}) P_{eri}}{1 - P_{eri}} = \sum \frac{P + P_{ti}}{1 - P_{eri}}$$

$$\text{Min} SI = \sum \frac{P + \rho i + ni \cdot ni \cdot \frac{Di}{Mi}}{\sigma i + \omega i^{Di}}$$

When:

$$pi = (1 - P_{Vi}) SIFS + ni SIFS + P_{Vi} PIFS$$

$$ni = (1 - P_{Vi})$$

$$\sigma i = -P_{Vi}$$

$$\omega i = (1 - BER)$$

The MAC-Throughput is calculated as:

$$T_i = \frac{ni\, Di}{\text{Min } SI} = \frac{ni\, Di}{\sum \frac{P + \rho i + ni \cdot ni \cdot \frac{Di}{Mi}}{\sigma i + \omega i^{Di}}}$$

By taking the derivative of the MAC-Throughput formula with respect to the packet size, by assuming number of pack ets per BlockAck is constant, and by equating the derivative to zero, an optimization equation can be derived as:

$$(\sigma i + \omega i^{Di})(\rho i + P) + Di\left(\rho i + P + ni \cdot ni \cdot \frac{Di}{Mi}\right)\ln\omega i \cdot \omega i^{Di} = 0$$

Then for each node, the optimum packet size (Di) can be calculated for ni=1, 2, . . . until $$SI_i = \frac{SI}{N} = SI_M,$$

given that each node has maximum of $SI_M$ time during this service interval. The ni and Di can then be chosen such that $D_i \leq D_{MAX}$.

FIG. 13 illustrates a flow chart of the optimization algorithm in accordance with an exemplary embodiment. The algorithm is run at the AP after the data rate and $P_{vi}$ is estimated for all of the nodes. At S1300, the algorithm starts from the maximum possible value for packet size for each node. At S1301, the algorithm calculates $SI_i$ and compares the value with its maximum possible value $SI_M$. A smaller value indicates that more packets can be sent, so ni is increased as shown in S1302, and optimum Di is calculated as shown in S1303.

A larger value indicates that either ni or Di should be reduced. If ni is greater than 1 and Di for (ni–1) is smaller than $D_{max}$, then ni should be reduced as the final selection as shown in S1305. If ni is greater than 1 and Di for (ni–1) is larger than $D_{MAX}$ then ni is kept as is and Di is reduced with a factor f as shown in S1304. Also, if ni is equal to 1, then Di should also be reduced with factor f.

Figure 14:
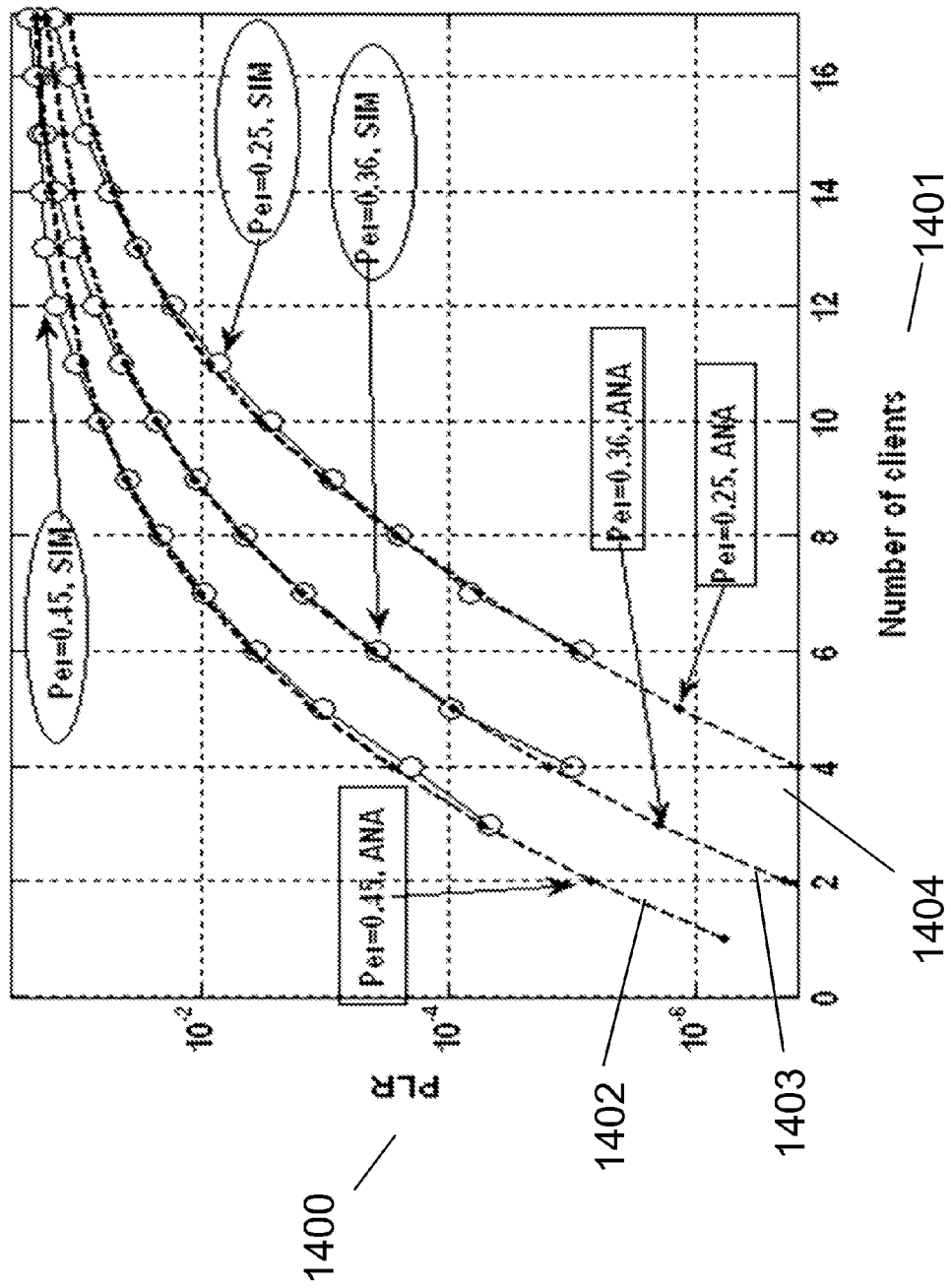
FIG. 14 is a plot of the packet loss rate when the parameters are assumed to be the same for all nodes.

FIG. 14 is a plot of the packet loss rate when the parameters are assumed to be the same for all nodes. The plot is for illustrating a baseline to which a comparison can be made with the optimization algorithm. The packet loss rate 1400 is plotted over the number of clients 1401. In this example, M=54 Mbps, $P_v$=0.1, SI=50 ms, $MAC_{through}$=3e6 and D=3e6×SI. The numbers on the plots are the physical layer probability of error as $1-(1-BER)^D$. The plots assume a physical layer probability of error of 0.45 as shown in 1402, 0.36 as shown in 1403 and 0.25 as shown in 1404.

Figure 15:
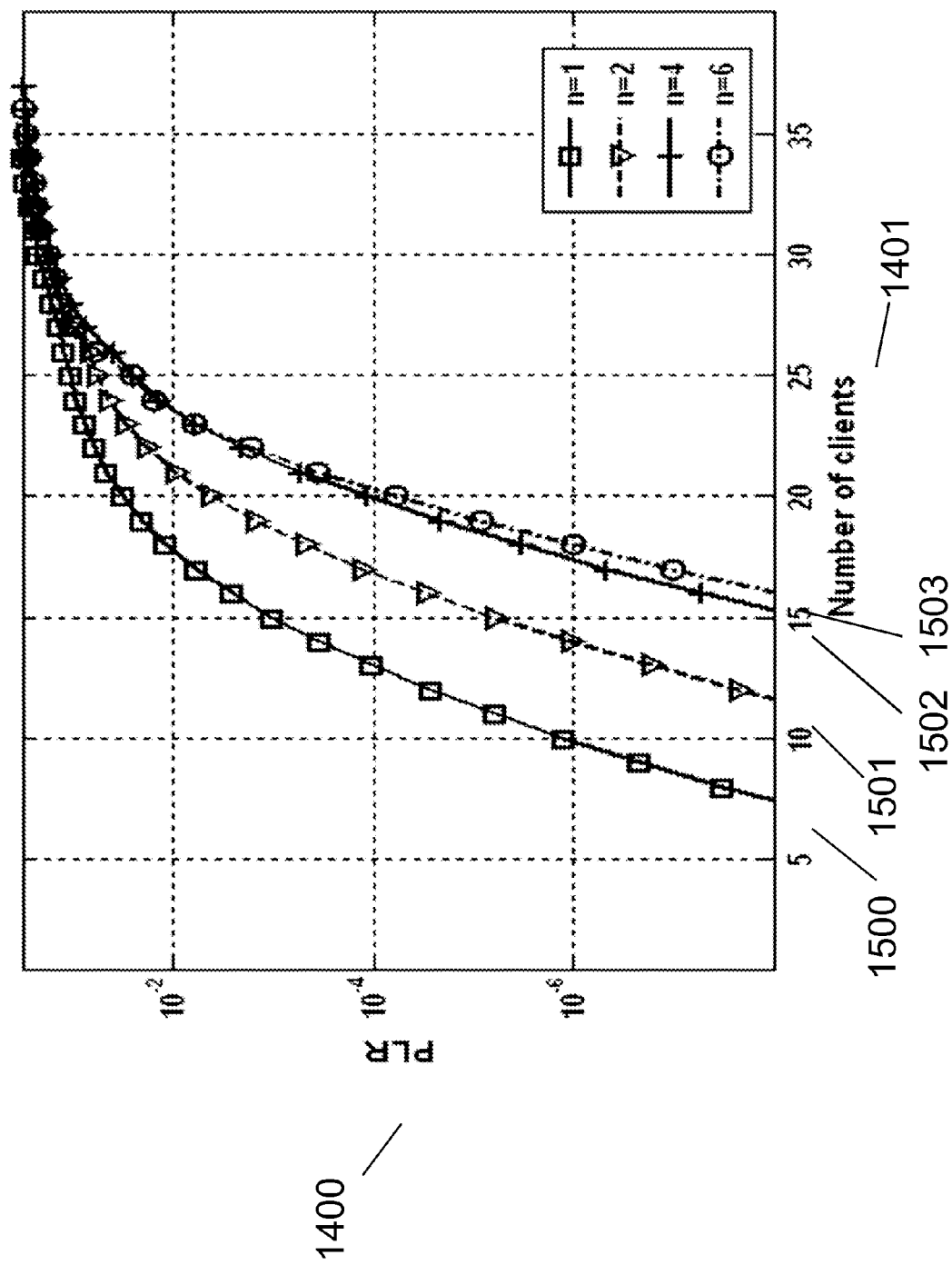
FIG. 15 illustrates a plot of the packet loss rate for SingleAck when n=1, and Block Ack when n>1.

FIG. 15 illustrates a plot of the packet loss rate for SingleAck when n=1, and BlockAck when n>1. In this example, M=90 Mbps, $P_v$=0.1, SI=25 ms, $MAC_{through}$=3e6, D=3e6× SI/n, and BER=0.4e. The SingleAck case (n=1) 1500 is plotted against the BlockAck cases 1501, 1502, and 1503, where n=2, 4 and 6, respectively. As shown in the figure, BlockAck allows for more clients while achieving the same PLR requirement.

Figure 16:
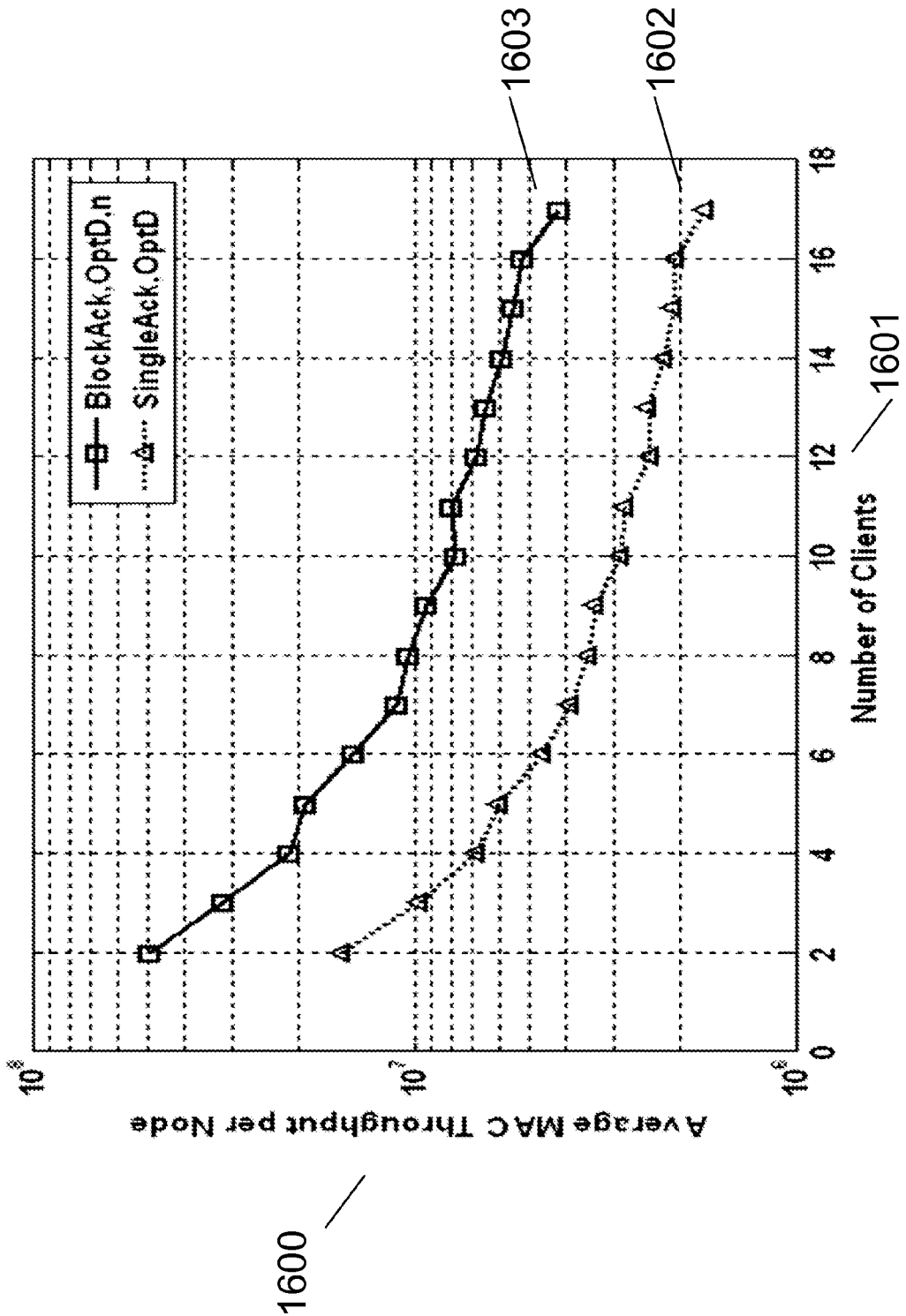
FIG. 16 illustrates the MAC throughput after the optimization algorithm is conducted for both the SingleAck and the BlockAck in accordance with an exemplary embodiment.

FIG. 16 illustrates the MAC throughput after the optimization algorithm is conducted for both the SingleAck and the BlockAck in accordance with an exemplary embodiment. The graph illustrates the average MAC Throughput 1600 versus the optimum packet size per number of clients 1601 for the singleAck case 1602 and the BlockAck case 1602. The simulation is averaged for 10 trials for each number of clients when each time M is randomly selected for each node from a pool of possible values based on 802.11n parameters. As the graph shows, for a required MAC throughput (for instance 3e6) the optimization algorithm results in allowing for more clients while maintaining a close to zero packet loss rate.

By utilizing the exemplary embodiments, other than deterministic latency with low packet error rate, the addition of BlockAck and directed Ack reduces overhead of acknowledging each packet one by one and the addition of the optimization algorithm for selecting the best packet size and number of packets per BlockAck increases throughput and therefore, more number of nodes (in an example shown in this document more than twice) can transmit their data packets with fixed MAC throughput per node within the chosen SI while packet error rate is kept to less than $10^{-6}$.

The exemplary embodiments are described herein in terms of combining the IEEE 802.11e HCCA standard and the IEEE 802.11n for the BlockAck. However, the exemplary embodiments are not limited to the system based on the IEEE802.11e and IEEE 802.11n standard and can be applied for any polling-based system.

Finally, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the invention will be apparent to those skilled in the art from consideration of the specification and practice of the invention disclosed herein. Various aspects and/or components of the described embodiments may be used singly or in any combination in a communication system. It is intended that the specification and examples be considered as exemplary only, with a true scope and spirit of the invention being indicated by the following claims.

What is claimed is:

1. An access point (AP), comprising:
   a receiver that receives data packets during an exhaustive polling phase or a selective polling phase, in accordance to Block Acknowledgement (BlockAck) set up information;
   a transmitter that transmits a BlockAck packet comprising the BlockAck set up information and a bit map indicating correctly received ones of the data packets during the exhaustive polling phase or the selective polling phase; and
   an optimization unit that updates the BlockAck setup information;
   wherein the BlockAck setup information comprises a size of the data packets and a number of the data packets;
   wherein the optimization unit updates the BlockAck setup information by updating the size of the data packets and the number of the data packets for receipt for a subsequent exhaustive polling phase or a subsequent selective polling phase during a Carrier Sense Multiple Access (CSMA) phase;
   wherein the optimization unit updates the size and the number based on a bit error rate, a probability of not receiving a packet for each node, and a physical layer probability of error for each node.

2. The AP of claim 1, wherein the BlockAck packet is combined with a polling packet for transmission during the exhaustive polling phase or the selective polling phase.

3. The AP of claim 1, wherein the optimization unit determines a service interval needed for meeting a packet loss rate threshold based on the number and the size, and increases the number and calculates the size based on the number when the determined service interval is less than a maximum possible service interval; and re-determines the service interval.

4. The AP of claim 3, wherein the optimization unit decreases the size or the number when the determined service interval is greater than a maximum possible service interval.

5. The AP of claim 3, wherein the optimization unit determines the service interval by assuming a maximum value for the size.

6. The AP of claim 1, wherein the BlockAck setup information comprises a starting sequence number of a received one of the data packets.

7. The AP of claim 1, wherein the BlockAck packet further comprises addresses for each node for acknowledgement.

8. A method, comprising:
   transmitting Block Acknowledgement (BlockAck) set up information;
   receiving data packets in response to the BlockAck setup information during an exhaustive or a selective polling phase;
   generating a BlockAck packet comprising a bit map indicating correctly received ones of the received data packets; and
   updating a size of the data packets and a number of the data packets for receipt in a subsequent exhaustive polling phase or a subsequent selective polling phase during a Carrier Sense Multiple Access (CSMA) phase;
   wherein the updating the size and the number is based on a bit error rate, a probability of not receiving a packet for each node, and a physical layer probability of error for each node.

9. The method of claim 8, further comprising combining the BlockAck set up information and the BlockAck packet with a polling packet for transmission during the exhaustive polling phase or the selective polling phase.

10. The method of claim 8, further comprising:
    calculating a service interval needed for meeting a packet loss rate threshold based on the number and the size;
    increasing the number;
    calculating the size based on the increased number when the calculated service interval is less than a maximum possible service interval; and
    recalculating the service interval.

11. The method of claim 10, further comprising decreasing either the size or the number when the calculated service interval is greater than the maximum possible service interval.

12. The method of claim 10, further comprising utilizing a maximum value for the size to calculate the service interval.

13. The method of claim 8, wherein the generating the BlockAck packet further comprises generating addresses for each node for acknowledgement.

14. The method of claim 8, further comprising generating the BlockAck set up information by generating a buffer window size for data packets, the buffer window size for data packets comprising a size of the data packets and a number of the data packets.

15. A station (STA), comprising:
    a receiver that receives Block Acknowledgment (BlockAck) set up information comprising a buffer window for data packets, packet data size and a number of the data packets; and
    a transmitter that transmits the data packets according to the buffer window, the packet data size and the number of the data packets indicated by the BlockAck set up information during an exhaustive polling phase or a selective polling phase;
    wherein the receiver receives a BlockAck packet comprising a bit map indicating correctly received ones of the data packets;
    wherein the receiver receives an update for the data packet size and the number of the data packets during the exhaustive polling phase or the selective polling phase, the update of the packet data size and the number of the data packets being based on a bit error rate, a probability of not receiving a packet for each node, and a physical layer probability of error for each node.

16. The STA of claim 15, further comprising a processor that determines whether the BlockAck packet is directed to the STA.

17. The STA of claim 15, wherein the transmitter re-transmits incorrectly received ones of the received data packets after receiving a polling message according to the bit map during the selective polling phase.

18. A method of operating a station (STA), comprising:
receiving Block Acknowledgment (BlockAck) set up information comprising a buffer window for data packets, packet data size and a number of the data packets;
transmitting the data packets according to the buffer window, the packet data size and the number of the data packets indicated by the BlockAck set up information;
receiving a BlockAck packet comprising a bit map indicating correctly received ones of the data packets; and
receiving an update for the packet data size and the number of packets during an exhaustive polling phase or a selective polling phase, the update of the packet data size and the number of packets being based on a bit error rate, a probability of not receiving a packet for each node, and a physical layer probability of error for each node.

19. The method of claim 18, further comprising determining whether the BlockAck packet is directed to the STA.

20. The method of claim 18, further comprising retransmitting incorrectly received ones of the received data packets after receiving polling message according to the bit map during the selective polling phase.

* * * * *